(12) United States Patent
Yamada et al.

(10) Patent No.: US 11,748,424 B2
(45) Date of Patent: Sep. 5, 2023

(54) VISITING DESTINATION PREDICTION DEVICE AND VISITING DESTINATION PREDICTION METHOD

(71) Applicant: NTT DOCOMO, INC., Chiyoda-ku (JP)

(72) Inventors: Masato Yamada, Chiyoda-ku (JP); Yusuke Fukazawa, Chiyoda-ku (JP)

(73) Assignee: NTT DOCOMO, INC., Chiyoda-ku (JP)

(*) Notice: Subject to any disclaimer, the term of this patent is extended or adjusted under 35 U.S.C. 154(b) by 258 days.

(21) Appl. No.: 17/047,458

(22) PCT Filed: Jan. 8, 2019

(86) PCT No.: PCT/JP2019/000219
§ 371 (c)(1),
(2) Date: Oct. 14, 2020

(87) PCT Pub. No.: WO2019/202782
PCT Pub. Date: Oct. 24, 2019

(65) Prior Publication Data
US 2021/0271722 A1    Sep. 2, 2021

(30) Foreign Application Priority Data
Apr. 18, 2018 (JP) .................. 2018-079817

(51) Int. Cl.
*G06F 7/00* (2006.01)
*G06F 16/9535* (2019.01)
(Continued)

(52) U.S. Cl.
CPC .......... *G06F 16/9535* (2019.01); *G06F 16/29* (2019.01); *G06N 5/04* (2013.01)

(58) Field of Classification Search
CPC ...... G06F 16/00; G06F 16/29; G06F 16/9535; G06F 16/909; G06F 16/2365;
(Continued)

(56) References Cited

U.S. PATENT DOCUMENTS 11,144,954 B1* 10/2021 Xu ........................... G07C 9/00
2013/0151148 A1* 6/2013 Parundekar ........ G01C 21/3679
707/E17.014
(Continued)

FOREIGN PATENT DOCUMENTS

JP    2010-244433 A    10/2010
JP    2017-207990 A    11/2017

OTHER PUBLICATIONS

International Preliminary Report on Patentability and Written Opinion dated Oct. 29, 2020 in PCT/JP2019/000219 (submitting English language translation only), 8 pages.
(Continued)

*Primary Examiner* — Mohammad A Sana
(74) *Attorney, Agent, or Firm* — Oblon, McClelland, Maier & Neustadt, L.L.P.

(57) ABSTRACT

A visiting destination prediction device includes: a user position information acquiring unit configured to acquire user position information indicating a position of a user; an action history acquiring unit configured to acquire information on an action history of the user; and a visiting POI estimating unit configured to estimate a visiting POI which is a visiting destination of the user on the basis of a relationship between an acquired user position and a previously stored POI position and a relationship between the acquired action history of the user in a predetermined period and previously stored POI relevant information.

6 Claims, 6 Drawing Sheets

(51) Int. Cl.
*G06F 16/29* (2019.01)
*G06N 5/04* (2023.01)

(58) Field of Classification Search
CPC .............. G06F 16/9537; G06F 11/3438; G06F 11/302; H04W 4/021; H04W 4/029
See application file for complete search history.

(56) References Cited

U.S. PATENT DOCUMENTS

| | | | |
|---|---|---|---|
| 2014/0236669 A1* | 8/2014 | Milton | G06Q 30/0201 705/7.29 |
| 2022/0239620 A1* | 7/2022 | Ikeda | H04L 51/04 |

OTHER PUBLICATIONS

International Search Report dated Mar. 19, 2019 in PCT/JP2019/000219 filed Jan. 8, 2019, 2 pages.
Japanese Office Action dated Dec. 6, 2022 in Japanese Patent Application No. 2020-513962 (with English Translation), 8 pages.

* cited by examiner

Fig.2

(a)
POSITIONING POINT TABLE — 11

| DATA ITEM |
| --- |
| LATITUDE: lat_i |
| LONGITUDE: lng_i |
| POSITIONING TIME: time_i |
| POSITIONING ERROR: acc_i |
| USER ID: u |

(b)
POI MASTER TABLE — 13

| DATA ITEM |
| --- |
| POI_ID: pid |
| POI NAME: pname |
| POI CATEGORY ID: pcat |
| POI POPULARITY RATING: pop |
| LATITUDE: plat |
| LONGITUDE: plng |
| AREA: pshape |
| PARENT POI_ID |
| CHILD POI FLAG |

(c)
VISITING POI TABLE — 17

| DATA ITEM |
| --- |
| CORRESPONDING STATIONARY POSITION ID: sid |
| POI_ID OF VISITING POI: pid |
| SCORE OF VISITING POI: pscore |
| POI ID_OF (CHILD) VISITING POI: pcid |
| SCORE OF (CHILD) VISITING POI: pcscore |

Fig. 3

(a) POI MASTER TABLE (EXTENSION) 13

| | POI NAME | SITE | APPLICATION | PHONE NUMBER | MAIL ADDRESS |
|---|---|---|---|---|---|
| 1 | ABC SHOPPING MALL | http://www.abc-shopping-mall.com/* | com.abc-shopping-mall.xxx | 045-0000-XXX | request@abc-shopping-mall.com |
| 2 | 123 RESTAURANT AKASAKA | http://www.123restaurant.co.jp/* | jp.co.123restaurant.xxx | 03-5156-YYYY | — |
| 3 | xyz BAR AKASAKA | http://www.gourmet.co.jp/shopid=xyz | — | 03-5156-ZZZZ | xyz@gourmet.co.jp |

(b) ACTION HISTORY TABLE 12

| | USER ID | DATE AND TIME | ACTION | OBJECT |
|---|---|---|---|---|
| 1 | User01 | 2018/2/15 10:32 | BROWSING OF SITE | http://www.abc-shopping-mall.com/* |
| 2 | User02 | 2018/2/15 10:58 | USE OF APPLICATION | jp.co.123restaurant.xxx |
| 3 | User03 | 2018/2/15 11:02 | TRANSMISSION OF MAIL | xyz@gourmet.co.jp |
| 4 | User04 | 2018/2/15 11:17 | PURCHASE OF COMMODITY | ABC SHOPPING MALL |

Fig.6

VISITING DESTINATION PREDICTION DEVICE AND VISITING DESTINATION PREDICTION METHOD

TECHNICAL FIELD

The invention relates to a visiting destination prediction device and a visiting destination prediction method for predicting a visiting destination of a user.

BACKGROUND ART

A technique is known in which positions of facilities (points of interest (hereinafter referred to as POIs)) which can serve as a visiting destination of a user are preliminarily stored, position information (for example, a global positioning system (GPS) position log) indicating a position of the user is acquired, and a visiting POI which is a visiting destination of the user is predicted on the basis of a relationship (for example, a distance) between a staying position of the user indicated by the position information and a position of a POI.

Patent Literature 1 proposes a technique of estimating facilities which have been visited by a user while traveling, by using travel histories which are acquired from a plurality of facilities (for example, ticket gates of stations visited while traveling and entrance/exit gates of toll roads) installed at places other than a staying position of the user. In the technique described in Patent Literature 1, a process of recording a passage history which is performed by a plurality of facilities installed at places other than a staying position of a user and a process of collecting information of the recorded passage history need to be performed, therefore it is preferable that the technique be more easily implemented without requiring such large-scale equipment and processes.

CITATION LIST

Patent Literature

[Patent Literature 1] Japanese Unexamined Patent Publication No. 2010-244433

SUMMARY OF INVENTION

Technical Problem

From the point of view of simple implementation, position information (for example, a GPS position log) of a user can be acquired relatively easily. However, when a user stays in an area in which a plurality of POIs are gathered, a commercial complex including a plurality of POIs, and the like and it is intended to estimate a visiting POI on the basis of only position information (for example, a GPS position log), accurate prediction of the visiting POI is limited due to a positioning error or the like included in the position information.

Therefore, an objective of the invention is to more accurately estimate a visiting POI by using information on an action history in addition to position information of a user.

Solution to Problem

According to an embodiment of the invention, there is provided a visiting destination prediction device including: a user position information acquiring unit configured to acquire user position information indicating a position of a user; an action history acquiring unit configured to acquire information on an action history of the user in a predetermined period; and a visiting POI estimating unit configured to estimate a visiting POI which is a visiting destination of the user on the basis of a relationship between a user position acquired by the user position information acquiring unit and a preliminarily stored POI position and a relationship between the action history of the user in the predetermined period acquired by the action history acquiring unit and preliminarily stored POI relevant information.

In the visiting destination prediction device, the user position information acquiring unit acquires user position information indicating a position of a user, the action history acquiring unit acquires information on an action history of the user in a predetermined period, and the visiting POI estimating unit estimates a visiting POI which is a visiting destination of the user on the basis of a relationship between an acquired user position and a preliminarily stored POI position and a relationship between the acquired action history of the user in the predetermined period and preliminarily stored POI relevant information. In this way, by estimating a visiting POI which is a visiting destination of the user on the basis of the relationship between the action history of the user in the predetermined period and preliminarily stored POI relevant information in addition to the relationship between the user position and the preliminarily stored POI position by using information on an action history in addition to the position information of the user, it is possible to more accurately estimate a visiting POI.

Advantageous Effects of Invention

According to the invention, it is possible to more accurately estimate a visiting POI by using information on an action history in addition to position information of a user.

BRIEF DESCRIPTION OF DRAWINGS

FIG. 2(a) is a diagram schematically illustrating a positioning point table, FIG. 2(b) is a diagram schematically illustrating a POI master table, and FIG. 2(c) is a diagram schematically illustrating a visiting POI table.

FIG. 3(a) is a diagram schematically illustrating an extension of the POI master table and FIG. 3(b) is a diagram schematically illustrating an action history table.

DESCRIPTION OF EMBODIMENTS

Hereinafter, an embodiment of the invention will be described with reference to the accompanying drawings.

[Configuration of Visiting Destination Prediction Device]

Figure 1:
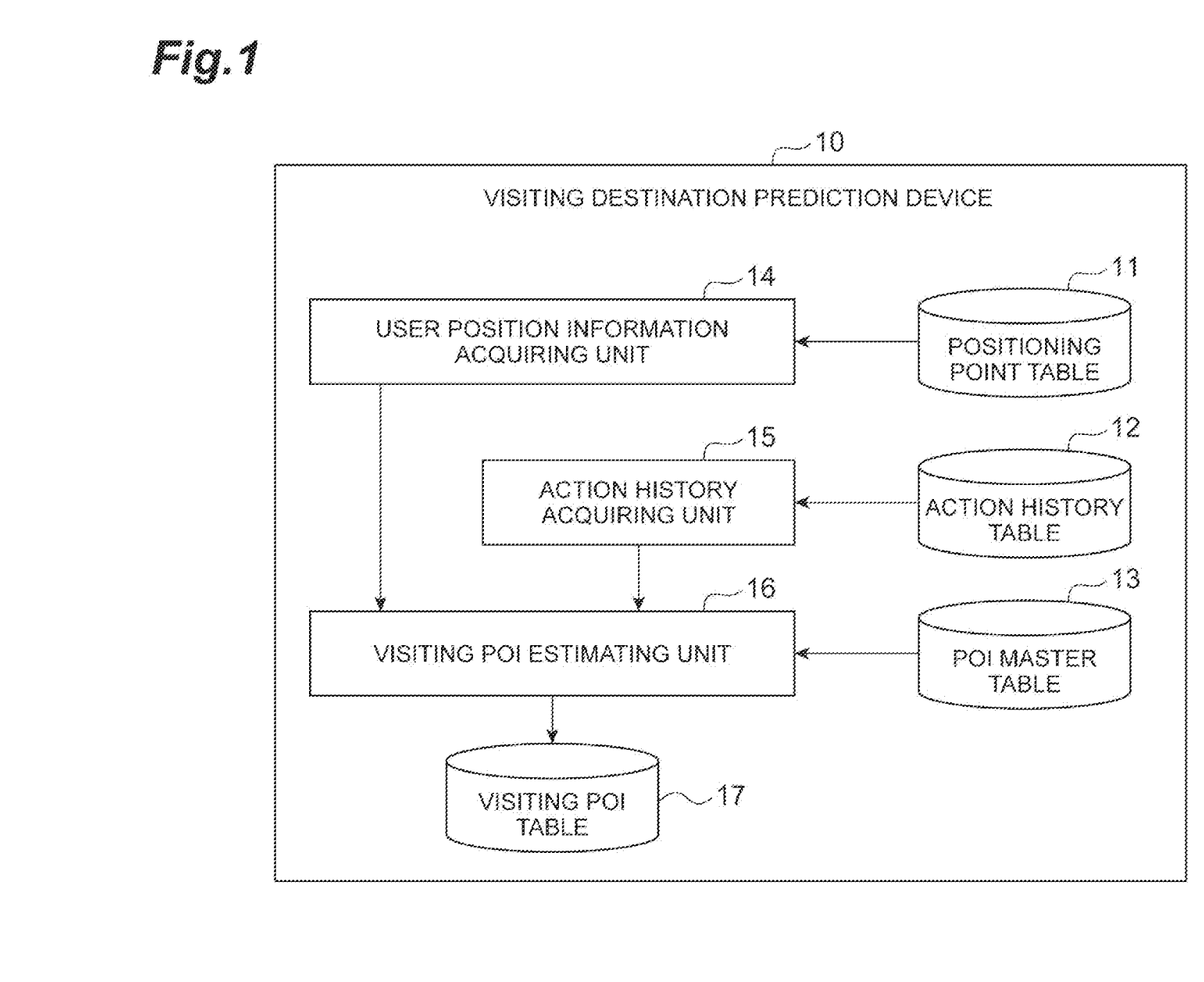
FIG. 1 is a functional block diagram illustrating a visiting destination prediction device according to an embodiment of the invention.

As illustrated in FIG. 1, a visiting destination prediction device 10 according to an embodiment includes a positioning point table 11, an action history table 12, a POI master table 13, a user position information acquiring unit 14, an action history acquiring unit 15, a visiting POI estimating unit 16, and a visiting POI table 17.

Figure 2:
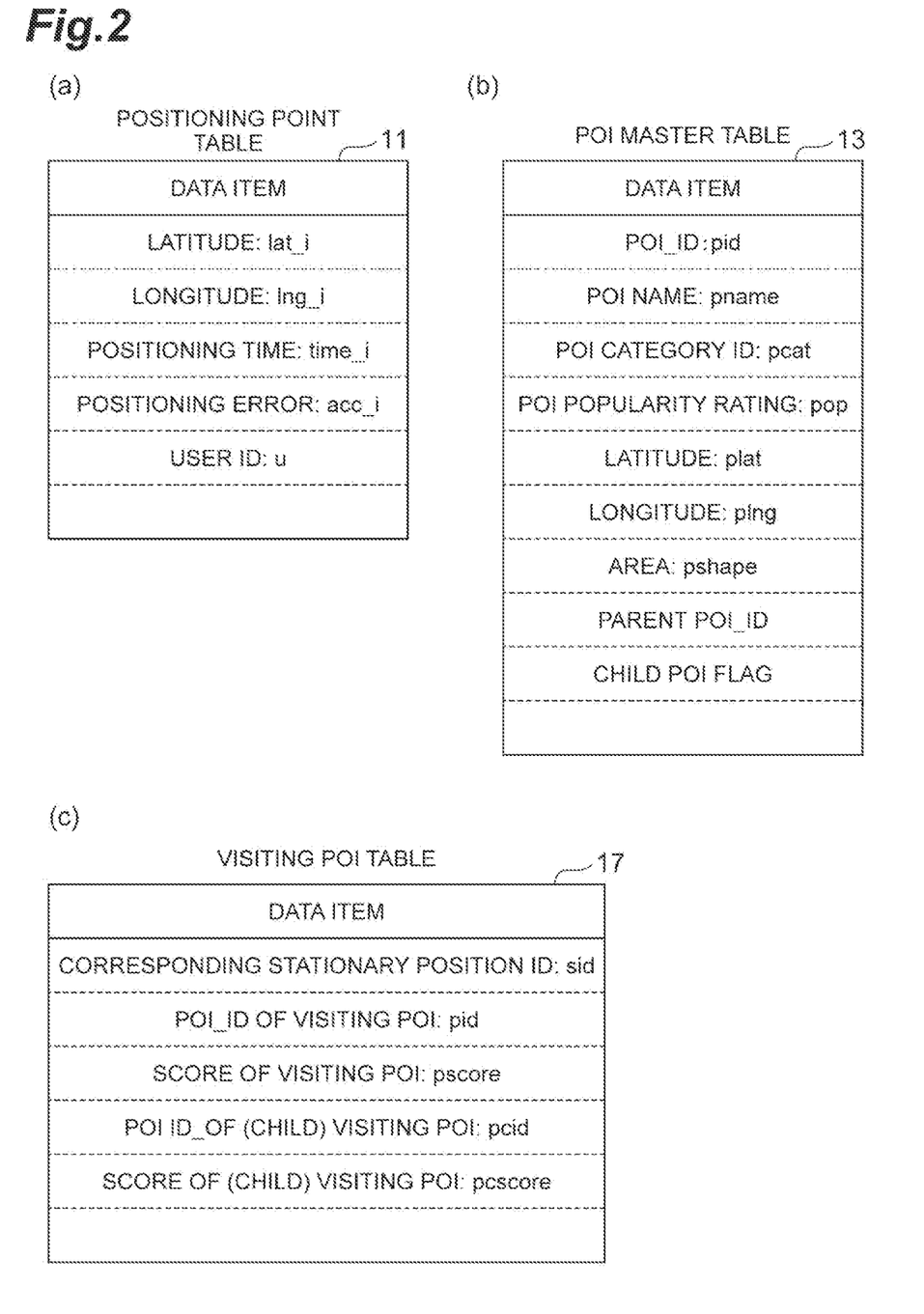
FIG. 2 is a diagram schematically illustrating various tables, where

The positioning point table 11 is a table that stores user position information indicating a position of a user and that stores information such as a latitude and longitude indicating the position of the user acquired by positioning, a positioning time at which positioning was performed, a positioning error, and a user ID for identifying the user, for example, as illustrated in FIG. 2(*a*).

Figure 3:
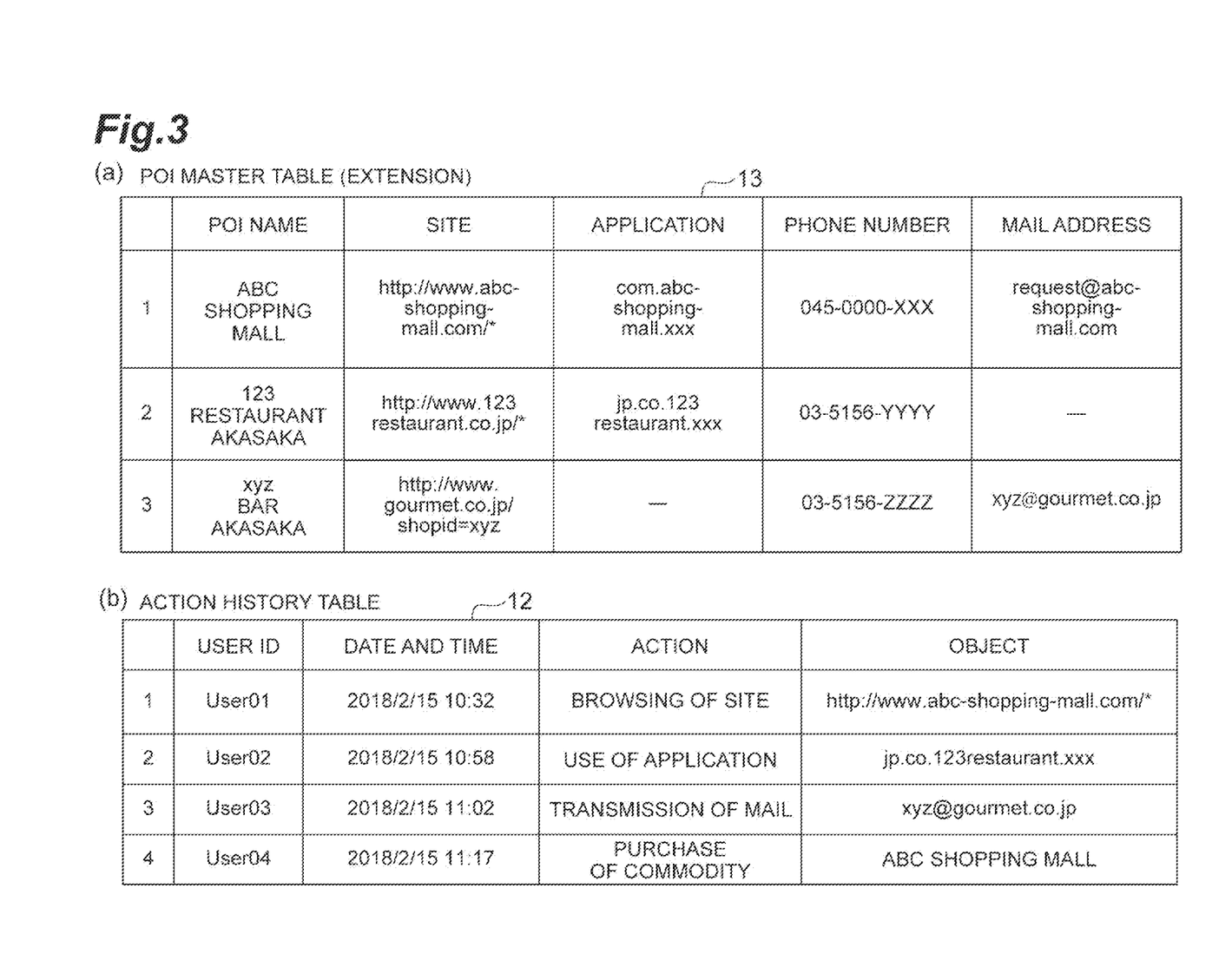
FIG. 3 is a diagram schematically illustrating various tables, where

The action history table 12 is a table that stores information on an action history of a user and stores information such as a user ID for identifying the user, a date and time at which the user performed an action, a type of action (for example, browsing of a site, use of an application, transmission of a mail, and purchase of a commodity), and an action object (for example, an address of a browsed site, an identification name of a used application, a destination address of a transmitted mail, and a place in which a commodity was purchased), for example, as illustrated in FIG. 3(*b*).

The POI master table 13 is a table that stores POI relevant information on individual POIs which have been preliminarily registered (for example, information on POI positions and POI names) and stores a POI_ID and a POI name for identifying a POI, a POI category ID indicating a category of a POI, a POI popularity rating indicating a popularity rating of a POI, a latitude and longitude indicating a POI position, information on an area representing a building or a site of a POI (for example, geometry data representing a shape correlated with the POI), a parent POI_ID for identifying a parent POI of a POI when there is a parent POI, and a parent POI flag indicating whether a POI is a parent POI, for example, as illustrated in FIG. 2(*b*). According to this embodiment as illustrated in FIG. 3(*a*), a POI name, a WEB site in which information on the POI is disclosed, an identification name of an application associated with the POI, a phone number of the POI, and a mail address are stored as POI relevant information in the POI master table 13.

The user position information acquiring unit 14 is a constituent element that acquires user position information from the positioning point table 11, derives a stationary area of the user on the basis of the user position information, and hands over the derived stationary area to the visiting POI estimating unit 16.

The action history acquiring unit 15 is a constituent element that acquires information on an action history of the user from the action history table 12 and hands over the acquired information to the visiting POI estimating unit 16.

Although details of processes thereof will be described later, the visiting POI estimating unit 16 is a constituent element that estimates a visiting POI which is a visiting destination of the user on the basis of a relationship between the user position acquired by the user position information acquiring unit 14 and a preliminarily stored POI position and a relationship between the action history in a predetermined period acquired by the action history acquiring unit 15 and preliminarily stored POI relevant information.

The visiting POI table 17 is a table that stores information on a visiting POI which is acquired through estimation by the visiting POI estimating unit 16 and stores, for example, information such as a corresponding stationary position ID, a POI_ID for identifying a visiting POI, a score of the visiting POI, a POI_ID of a (child) visiting POI for identifying a child POI corresponding thereto (to a parent POI), and a score of the (child) visiting POI as illustrated in FIG. 2(*c*). The "score" refers to an index that is used for estimating a visiting POI which will be described later and that indicates a probability of a candidate POI being estimated as a visiting POI.

The visiting destination prediction device 10 does not have to include all of the positioning point table 11, the action history table 12, the POI master table 13, and the visiting POI table 17, and one or more tables of these tables may be provided outside of the visiting destination prediction device 10 and may transmit and receive information to and from the visiting destination prediction device 10.

[Processes Associated with Visiting Destination Prediction Method]

Figure 4:
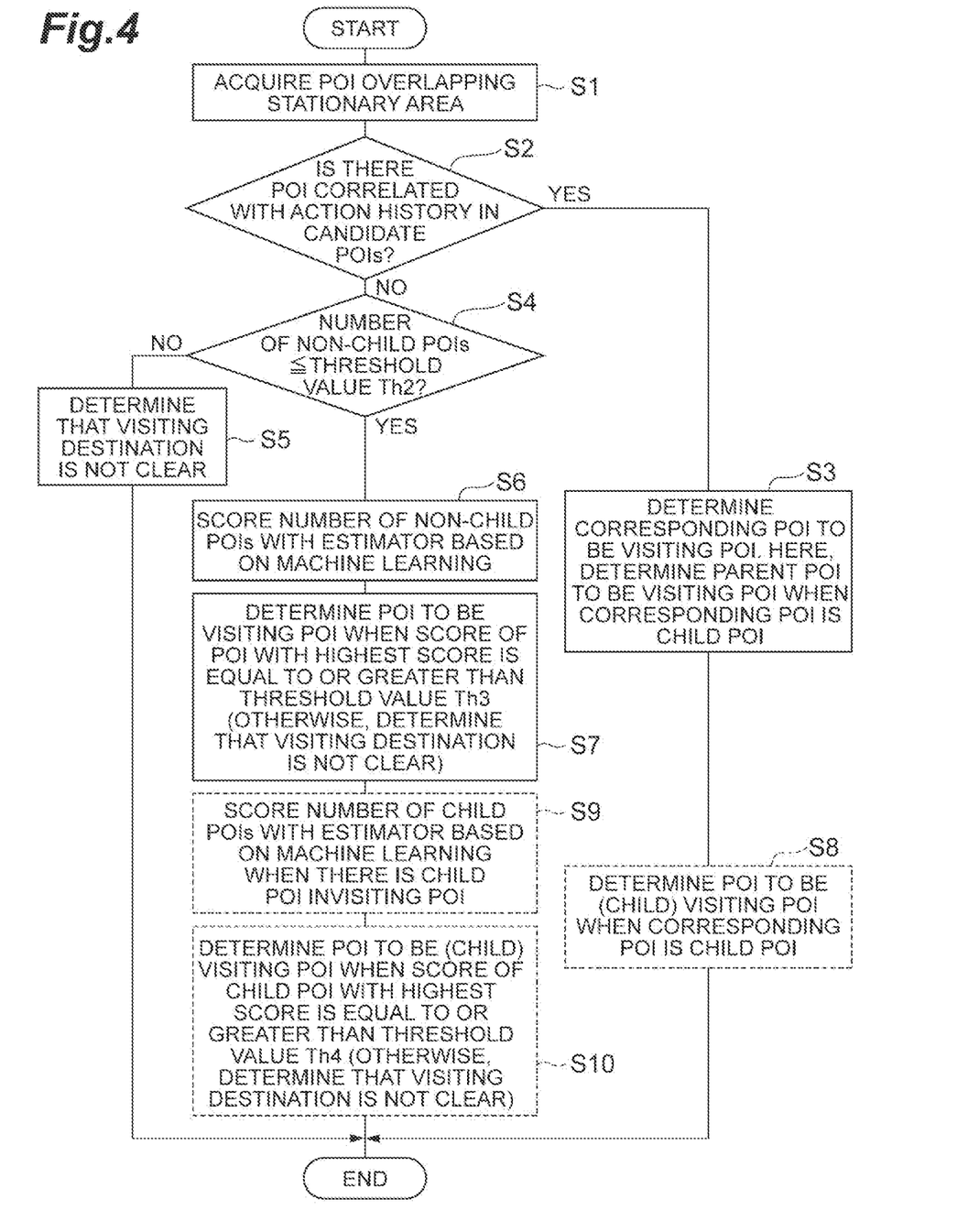
FIG. 4 is a flowchart illustrating a first pattern of a visiting destination prediction process.

A process flow associated with a visiting destination prediction method according to this embodiment will be described below with reference to FIGS. 4 and 5. Now, two process patterns will be sequentially described below. A first pattern (FIG. 4) is a process pattern of determining that a POI correlated with an action history is a visiting POI when the POI is included among candidate POIs and determining a visiting POI on the basis of scores of POIs acquired by scoring using machine learning when the POI is not included among the candidate POIs. A second pattern (FIG. 5) is a process pattern of adding a weight value to the score of a POI correlated with an action history when the POI is included among the candidate POIs and determining a visiting POI on the basis of the scores of the POIs acquired by scoring using machine learning.

First, the first pattern (FIG. 4) of processes associated with the visiting destination prediction method will be described below. The user position information acquiring unit 14 acquires user position information from the positioning point table 11, derives a stationary area of a user on the basis of the user position information, and hands over the derived stationary area to the visiting POI estimating unit 16. The process of deriving a stationary area may be performed on the basis of the same techniques as in the related art. The visiting POI estimating unit 16 sets POIs whose POI positions overlap the stationary area of the user as candidate POIs with reference to the POI relevant information (such as information on a POI position) stored in the POI master table 13 and acquires POI relevant information on the candidate POI from the POI master table 13 (Step S1).

The action history acquiring unit 15 acquires information on an action history of the user from the action history table 12 and hands over the acquired information to the visiting POI estimating unit 16, and the visiting POI estimating unit 16 determines whether or not a POI correlated with the action history of the user in a past predetermined period is included among candidate POIs (Step S2). The determination of Step S2 is performed, for example, as follows.

With attention to an action history of User01 illustrated in the action history table 12 in FIG. 3(*b*), a site is browsed, and an address of the browsed site is determined to correspond to an address of "ABC shopping mall" from the POI master table 13 illustrated in FIG. 3(*a*). Accordingly, "ABC shopping mall" corresponds to the POI correlated with the action history of User01, and it is determined whether "ABC shopping mall" is included among candidate POIs.

With attention to an action history of User02 illustrated in the action history table 12 in FIG. 3(*b*), an application is used, and an ID of the application is determined to correspond to an ID of an application associated with "123 restaurant AKASAKA" from the POI master table 13 illustrated in FIG. 3(*a*). Accordingly, "123 restaurant AKASAKA" corresponds to the POI correlated with the action history of User02, and it is determined whether "123 restaurant AKASAKA" is included among candidate POIs.

With attention to an action history of User03 illustrated in the action history table 12 in FIG. 3(*b*), a mail is transmitted, and an address of a destination thereof is determined to correspond to a mail address of "xyz bar AKASAKA" from the POI master table 13 illustrated in FIG. 3(*a*). Accordingly, "xyz bar AKASAKA" corresponds to the POI correlated with the action history of User03, and it is determined whether "xyz bar AKASAKA" is included among candidate POIs.

With attention to an action history of User04 illustrated in the action history table 12 in FIG. 3(*b*), a commodity is purchased, and a purchase place thereof is determined to correspond to a POI name of "ABC shopping mall" stored the POI master table 13 illustrated in FIG. 3(*a*). Accordingly, "ABC shopping mall" corresponds to the POI correlated with the action history of User04, and it is determined whether "ABC shopping mall" is included among candidate POIs.

When it is determined in Step S2 that a POI correlated with the action history of the user is included among candidate POIs, the visiting POI estimating unit 16 determines the POT as a visiting POI (Step S3). At this time, the visiting POI estimating unit 16 refers to a parent POI_ID of the POI relevant information of the POI and determines the parent POI as a visiting POI when the POI is a child POI (that is, there is a parent POI). The child POI is determined as a (child) visiting POI (Step S8).

On the other hand, when it is determined in Step S2 that a POI correlated with the action history of the user is not included among the candidate POIs, it is determined whether the number of non-child POIs (that is, parent POIs or POIs which are neither parent POIs nor child POIs) out of the candidate POIs is equal to or less than a predetermined threshold value Th2 for determining whether narrowing down is to be performed (Step S4). When the number of non-child POIs is equal to or less than the threshold value Th2, it is predicted that narrowing down is to be performed and thus Step S6 is performed. On the other hand, when the number of non-child POIs is greater than the threshold value Th2, it is predicted that narrowing down is not to be performed and it is determined that a visiting destination is not clear (Step S5). In Step S5, for example, the visiting POI estimating unit 16 may notify an operator that estimation of a visiting POI is not possible.

In Step S6, the non-child POIs are subjected to scoring based on estimation using machine learning. Here, scoring based on the related art may be employed.

Then, the visiting POI estimating unit 16 determines whether the score of a POI with a highest score is equal to or greater than a predetermined threshold value Th3 for determining a visiting POI in the result of scoring, and determines the POI with the highest score as a visiting POI when the score of the POI with the highest score is equal to or greater than the threshold value Th3 (Step S7). When the score of the POI with the highest score is less than the threshold value Th3, the POI with the highest score cannot be determined as a visiting POI and thus it is determined that a visiting destination is not clear similarly to Step S5. For example, the visiting POI estimating unit 16 may notify an operator that estimation of a visiting POI is not possible.

When there is a child POI of the POI determined as a visiting POI, Steps S9 and S10 are performed. That is, the visiting POI estimating unit 16 performs scoring on the child POI based on estimation using machine learning (Step S9). Here, scoring based on the related art may be employed.

The visiting POI estimating unit 16 determines whether the score of a child POI with the highest score is equal to or greater than a predetermined threshold value Th4 for determining a visiting POI in the result of scoring, and determines the child POI with the highest score as a (child) visiting POI when the score of the child POI with the highest score is equal to or greater than the threshold value Th4 (Step S10). When the score of the child POI with the highest score is less than the threshold value Th4, it is determined that a visiting destination is not clear similarly to Step S5. For example, the visiting POI estimating unit 16 may notify an operator that estimation of a (child) visiting POI is not possible.

Using the first pattern (FIG. 4) of processes associated with the above-mentioned visiting destination prediction method, it is possible to estimate a visiting POI with priority given to a POI correlated with an action history. When a POI correlated with an action history is not included among the candidate POIs, it is possible to appropriately estimate a visiting POI on the basis of the scores of the POIs acquired by scoring using machine learning.

The second pattern (FIG. 5) of processes associated with the visiting destination prediction method will be described below. The second pattern is different from the first pattern (FIG. 4) in process details of Steps S3A and S8A and thus Steps S3A and S8A will be mainly described below.

Figure 5:
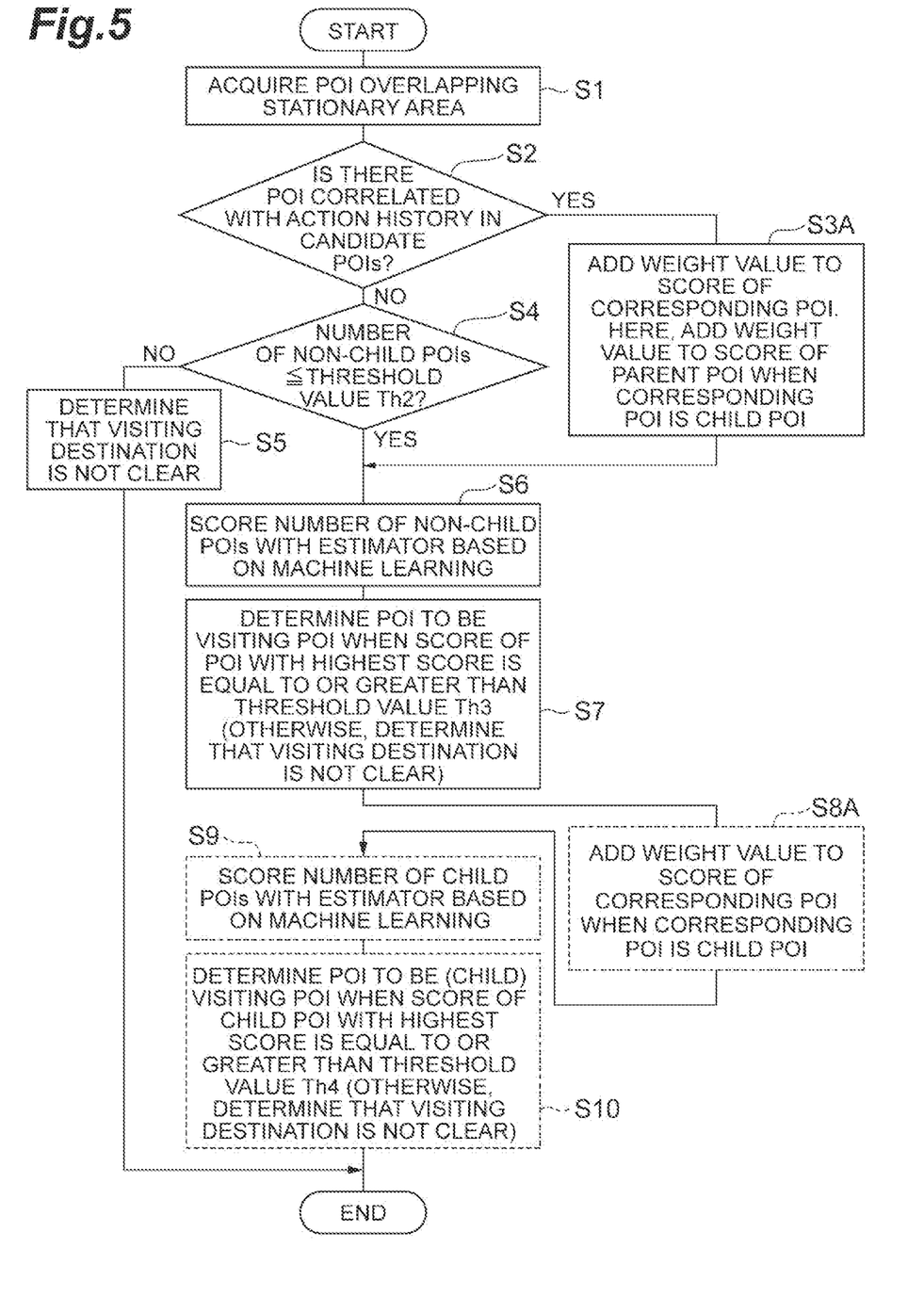
FIG. 5 is a flowchart illustrating a second pattern of the visiting destination prediction process.

When it is determined in Step S2 of FIG. 5 that a POI correlated with the action history of the user is included among the candidate POIs, the visiting POI estimating unit 16 adds a weight value to the score of the POI in Step S3A. Here, when the POI is a child POI, the visiting POI estimating unit 16 adds a weight value to the score of a parent POI thereof.

The "weight value" may be adjusted on the basis of an action type and an action date and time of the user. For example, the "weight value" may be adjusted on the basis of a predetermined rule such as "the weight value decreases as the action date and time becomes farther in the past," "the weight value becomes higher when web browsing is immediately before the action date and time in a case where the action type is web browsing of a map page or web browsing for a phone number," or "the weight value does not change considerably before or immediately before the action date and time (a date and time of transmission) when the action type is mail transmission."

When the process of Step S3A is completed, similarly to the first pattern (FIG. 4), scoring based on estimation using machine learning is performed on a non-child POI in Step S6, the POI with the highest score is determined as a visiting POI when the score of the POI with the highest score is equal to or greater than a predetermined threshold value Th3 for determining a visiting POI in the result of scoring, and it is determined that a visiting destination is not clear when the score of the POI with the highest score is less than the threshold value Th3 (Step S7).

When the POI determined as the visiting POT is a child POI, the weight value is added to the score of the (child) visiting POI score of the POI (Step S8A). Thereafter, similarly to the first pattern in FIG. 4, scoring based on estimation using machine learning is performed on the child POI (Step S9), and a child POI with the highest score in the result of scoring is determined as a (child) visiting POI when the score of the child POI with the highest score is equal to or greater than a predetermined threshold value Th4 for determining a visiting POI (Step S10).

Using the second pattern (FIG. 5) of processes associated with the above-mentioned visiting destination prediction method, the weight value is added to the score of the corresponding POI when the POI correlated with the action history is included among the candidate POIs, and it is possible to appropriately estimate a visiting POI on the basis of the scores of the POIs acquired by scoring using machine learning.

When the weight value is adjusted as described above in Step S3A, it is possible to more appropriately weight the scores of the POIs on the basis of the action type and the action date and time and to more accurately estimate a visiting POI.

The block diagrams which are used above for description of the embodiment illustrate blocks of functional units. Such functional blocks (functional units) are realized by an arbitrary combination of hardware and/or software. A means for realizing each functional block is not particularly limited. That is, each functional block may be realized by a single device which is physically and/or logically combined or may be realized by two or more devices which are physically and/or logically separated and which are directly and/or indirectly linked to each other (for example, in a wired and/or wireless manner).

Figure 6:
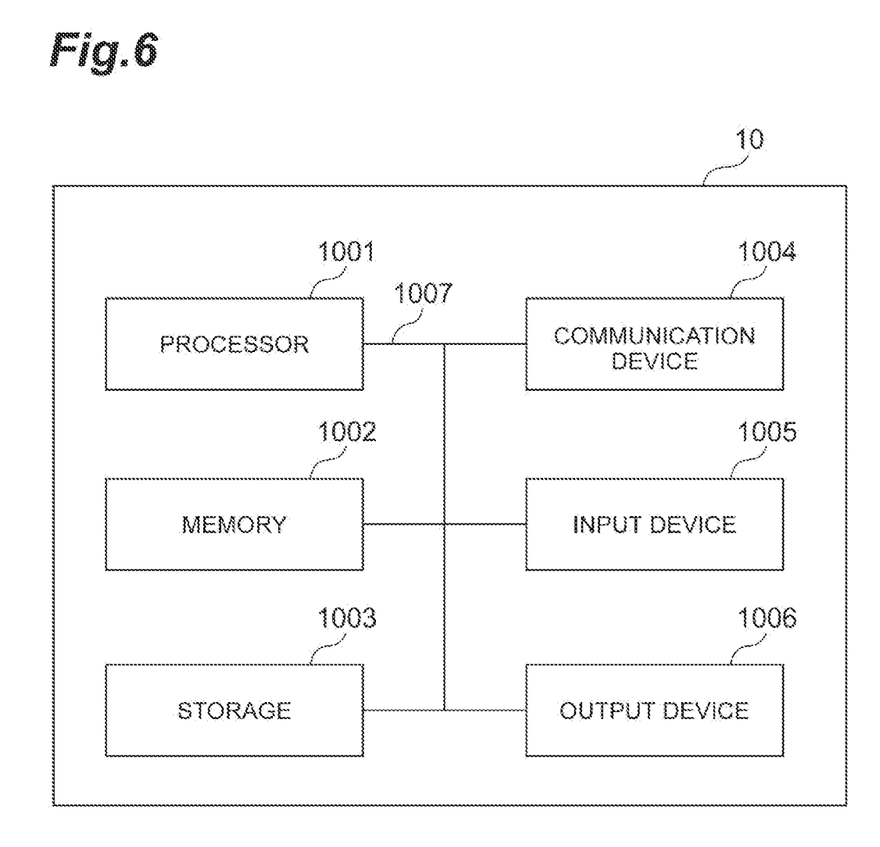
FIG. 6 is a diagram illustrating an example of a hardware configuration of the visiting destination prediction device.

For example, the visiting destination prediction device 10 according to the embodiment may serve as a computer that performs the processes of the visiting destination prediction device 10. FIG. 6 is a diagram illustrating an example of a hardware configuration of the visiting destination prediction device 10. The visiting destination prediction device 10 may be physically configured as a computer device including a processor 1001, a memory 1002, a storage 1003, a communication device 1004, an input device 1005, an output device 1006, and a bus 1007.

In the following description, the term "device" can be replaced with circuit, device, unit, or the like. The hardware of the visiting destination prediction device 10 may be configured to include one or more devices illustrated in the drawings or may be configured to exclude some devices thereof.

The functions of the visiting destination prediction device 10 can be realized by reading predetermined software (program) to the hardware such as the processor 1001 and the memory 1002 and causing the processor 1001 to execute arithmetic operations and to control communication using the communication device 1004 and reading and/or writing of data with respect to the memory 1002 and the storage 1003.

The processor 1001 controls a computer as a whole, for example, by causing an operating system to operate. The processor 1001 may be configured as a central processing unit (CPU) including an interface with peripherals, a controller, an arithmetic operation unit, and a register. For example, the functional units of the visiting destination prediction device 10 may be realized by the processor 1001.

The processor 1001 reads a program (a program code), a software module, data, or the like from the storage 1003 and/or the communication device 1004 to the memory 1002 and performs various processes in accordance therewith. As the program, a program that causes a computer to perform at least some of the operations described in the above-mentioned embodiment is used. For example, the functional units of the visiting destination prediction device 10 may be realized by a control program which is stored in the memory 1002 and which operates in the processor 1001, and the other functional blocks may be realized in the same way. The various processes described above are described as being performed by a single processor 1001, but they may be simultaneously or sequentially performed by two or more processors 1001. The processor 1001 may be mounted as one or more chips. The program may be transmitted from a network via an electrical telecommunication line.

The memory 1002 is a computer-readable recording medium and may be constituted by, for example, at least one of a read only memory (ROM), an erasable programmable ROM (EPROM), an electrically erasable programmable ROM (EEPROM), and a random access memory (RANI). The memory 1002 may be referred to as a register, a cache, a main memory (a main storage device), or the like. The memory 1002 can store a program (a program code), a software module, and the like that can be executed to perform the method according to one embodiment of the invention.

The storage 1003 is a computer-readable recording medium and may be constituted by, for example, at least one of an optical disc such as a compact disc ROM (CD-ROM), a hard disk drive, a flexible disk, a magneto-optical disc (for example, a compact disc, a digital versatile disc, or a Blu-ray (registered trademark) disc), a smart card, a flash memory (for example, a card, a stick, or a key drive), a floppy (registered trademark) disk, and a magnetic strip. The storage 1003 may be referred to as an auxiliary storage device. The storage mediums may be, for example, a database, a server, or another appropriate medium including the memory 1002 and/or the storage 1003.

The communication device 1004 is hardware (a transmission and reception device) that performs communication between computers via a wired and/or wireless network and is also referred to as, for example, a network device, a network controller, a network card, or a communication module. For example, the functional units of the visiting destination prediction device 10 may be realized by the communication device 1004.

The input device 1005 is an input device that receives an input from the outside (for example, a keyboard, a mouse, a microphone, a switch, a button, or a sensor). The output device 1006 is an output device that performs an output to the outside (for example, a display, a speaker, or an LED lamp). The input device 1005 and the output device 1006 may be configured as a unified body (for example, a touch panel).

The devices such as the processor 1001 and the memory 1002 are connected to each other via the bus 1007 for transmission of information. The bus 1007 may be constituted by a single bus or may be constituted by buses which are different depending on the devices.

The visiting destination prediction device 10 may be configured to include hardware such as a microprocessor, a digital signal processor (DSP), an application specific integrated circuit (ASIC), a programmable logic device (PLD), or a field programmable gate array (FPGA), and some or all of the functional blocks may be realized by the hardware. For example, the processor 1001 may be mounted as at least one piece of hardware.

While an embodiment of the invention has been described above in detail, it will be apparent to those skilled in the art that the invention is not limited to the embodiment described in this specification. The invention can be altered and modified in various forms without departing from the gist and scope of the invention defined by description in the appended claims. Accordingly, the description in this specification is for exemplary explanation and does not have any restrictive meaning for the invention.

The order of processing sequences, sequences, flowcharts, and the like of the aspects/embodiments described above in this specification may be changed as long as no technical contradictions arise. For example, in the method described in this specification, various steps are described as elements of an exemplary sequence, but the method is not limited to the described sequence.

Information or the like which is input and output may be stored in a specific place (for example, a memory) or may be managed in a management table. The information or the like which is input and output may be overwritten, updated, or added. The information or the like which is output may be deleted. The information or the like which is input may be transmitted to another device.

Determination may be performed using a value (0 or 1) which is expressed in one bit, may be performed using a Boolean value (true or false), or may be performed by comparison of numerical values (for example, comparison with a predetermined value).

The aspects/embodiments described in this specification may be used alone, may be used in combination, or may be switched during implementation thereof. Transmission of predetermined information (for example, transmission of "X") is not limited to explicit transmission, and may be performed by implicit transmission (for example, the predetermined information is not transmitted).

Regardless of whether it is called software, firmware, middleware, microcode, hardware description language, or another name, software can be widely construed to refer to commands, a command set, codes, code segments, program codes, a program, a sub program, a software module, an application, a software application, a software package, a routine, a sub routine, an object, an executable file, an execution thread, a sequence, a function, or the like.

Software, commands, and the like may be transmitted and received via a transmission medium. For example, when software is transmitted from a web site, a server, or another remote source using wired technology such as a coaxial cable, an optical fiber cable, a twisted-pair wire, or a digital subscriber line (DSL) and/or wireless technology such as infrared rays, radio waves, or microwaves, the wired technology and/or the wireless technology is included in the definition of the transmission medium.

Information, signals, and the like described in this specification may be expressed using one of various different techniques. For example, data, an instruction, a command, information, a signal, a bit, a symbol, and a chip which can be mentioned in the overall description may be expressed by a voltage, a current, an electromagnetic wave, a magnetic field or magnetic particles, a photo field or photons, or an arbitrary combination thereof.

Information, parameters, and the like which are described in this specification may be expressed by absolute values, may be expressed by values relative to predetermined values, or may be expressed by other corresponding information.

A mobile communication terminal may also be referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several other appropriate terms by those skilled in the art.

The term, "determining" or "determination," which is used in this specification may include various types of operations. The term, "determining" or "determination," may include, for example, cases in which judging, calculating, computing, processing, deriving, investigating, looking up (for example, looking up in a table, a database, or another data structure), and ascertaining are considered to be "determined." The term, "determining" or "determination," may include, for example, cases in which receiving (for example, receiving information), transmitting (for example, transmitting information), input, output, and accessing (for example, accessing data in a memory) are considered to be "determined." The term, "determining" or "determination," may include cases in which resolving, selecting, choosing, establishing, comparing, and the like are considered to be "determined." That is, the term, "determining" or "determination," can include cases in which a certain operation is considered to be "determined."

The expression "on the basis of," as used in this specification, does not mean "on the basis of only" unless otherwise described. In other words, the expression "on the basis of" means both "on the basis of only" and "on the basis of at least."

When the terms, "include," "including," and modifications thereof are used in this specification or the appended claims, the terms are intended to have a comprehensive meaning similar to the term "comprising." The term "or" which is used in this specification or the claims is not intended to mean an exclusive logical sum.

In this specification, two or more of any devices may be included unless the context or technical constraints dictate that only one device is included. In the entire present disclosure, singular terms include plural referents unless the context or technical constraints dictate that a unit is singular.

REFERENCE SIGNS LIST

10 . . . Visiting destination prediction device; 11 . . . Positioning point table; 12 . . . Action history table; 13 . . . POI master table; 14 . . . User position information acquiring unit; 15 . . . Action history acquiring unit; 16 . . . Visiting POI estimating unit; 17 . . . Visiting POI table; 1001 . . . Processor; 1002 . . . Memory; 1003 . . . Storage; 1004 . . . Communication device; 1005 . . . Input device; 1006 . . . Output device; 1007 . . . Bus.

The invention claimed is:

1. A visiting destination prediction device comprising circuitry configured to:
acquire user position information indicating a position of a user;
acquire information on an action history of the user in a predetermined period; and
estimate a visiting POI which is a visiting destination of the user on the basis of a relationship between an acquired user position and a previously stored POI position and a relationship between the acquired action history of the user in the predetermined period and previously stored POI relevant information,
wherein the circuitry is configured to
derive one or more candidate POIs on the basis of a relationship between a user position and a previously stored POI position,
acquire a score for the one or more candidate POIs based on machine learning, the score indicating a probability of the corresponding candidate POI being estimated as the visiting POI,
determine, among the one or more candidate POIs, whether there is a candidate POI including POI relevant information correlated with an action history, and the circuitry is configured to add a weight value to the score corresponding to the determined candidate POI when it is determined that there is a candidate POI including POI relevant information correlated with an action history, and estimate the visiting POI on the basis of the acquired score for each candidate POI when there is the candidate POI.

2. The visiting destination prediction device according to claim 1, wherein the circuitry is configured to adjust the weight value on the basis of an action type and an action date and time of a user.

3. The visiting destination prediction device according to claim 2, wherein the information on an action history of a user includes at least one of
information on a web browsing history,
information on an application usage history,
information on an outgoing history or incoming history of a call,
information on a transmission history or a reception history of an e-mail, and
information on a purchase history.

4. The visiting destination prediction device according to claim 1, wherein the information on an action history of a user includes at least one of
information on a web browsing history,
information on an application usage history,
information on an outgoing history or incoming history of a call,
information on a transmission history or a reception history of an e-mail, and
information on a purchase history.

5. The visiting destination prediction device according to claim 1, wherein the score for the one or more candidate POIs based on machine learning is acquired initially for non-child POIs among the one or more candidate POIs, and then after estimating the visiting POI, a score for any child POIs that are contained within the estimated visiting POI is acquired based on machine learning, and the circuitry further estimates a child visiting POI on the basis of the acquired score for each of the child POIs.

6. A visiting destination prediction method that is performed by a visiting destination prediction device, the visiting destination prediction method comprising:
acquiring user position information indicating a position of a user and information on an action history of the user in a predetermined period; and
estimating a visiting POI which is a visiting destination of the user on the basis of a relationship between an acquired user position and a previously stored POI position and a relationship between the acquired action history of the user in the predetermined period and previously stored POI relevant information,
wherein the method includes
deriving one or more candidate POIs on the basis of a relationship between a user position and a previously stored POI position,
acquiring a score for the one or more candidate POIs based on machine learning, the score indicating a probability of the corresponding candidate POI being estimated as the visiting POI,
determining, among the one or more candidate POIs, whether there is a candidate POI including POI relevant information correlated with an action history, and the circuitry is configured to add a weight value to the score corresponding to the determined candidate POI when it is determined that there is a candidate POT including POI relevant information correlated with an action history, and
estimating the visiting POI on the basis of the acquired score for each candidate POI when there is the candidate POI.

\* \* \* \* \*